(12) United States Patent
Harris et al.

(10) Patent No.: US 6,973,501 B1
(45) Date of Patent: Dec. 6, 2005

(54) REDUCING LOSS IN TRANSMISSION QUALITY UNDER CHANGING NETWORK CONDITIONS

(75) Inventors: Ralph L. Harris, Concord, OH (US); Steffen Rasmussen, Novelty, OH (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 873 days.

(21) Appl. No.: 09/598,642

(22) Filed: Jun. 21, 2000

(51) Int. Cl.$^7$ .............................................. G06F 13/00
(52) U.S. Cl. ..................................... 709/232; 709/247
(58) Field of Search ....................... 709/224, 230–235, 709/247, 246

(56) References Cited

U.S. PATENT DOCUMENTS

| | | | |
|---|---|---|---|
| 5,515,377 A * | 5/1996 | Horne et al. ........... 370/395.64 |
| 5,604,731 A | 2/1997 | Grossglauser et al. | |
| 5,621,660 A * | 4/1997 | Chaddha et al. ............ 709/247 |
| 6,011,590 A | 1/2000 | Saukkonen | |
| 6,014,694 A | 1/2000 | Aharoni et al. | |
| 6,078,594 A * | 6/2000 | Anderson et al. ........... 370/498 |
| 6,185,625 B1 * | 2/2001 | Tso et al. .................... 709/247 |
| 6,215,821 B1 * | 4/2001 | Chen ...................... 375/240.05 |
| 6,249,324 B1 * | 6/2001 | Sato et al. ................... 348/705 |
| 6,421,733 B1 * | 7/2002 | Tso et al. .................... 709/246 |
| 6,768,716 B1 * | 7/2004 | Abel et al. .................. 370/230 |

OTHER PUBLICATIONS

Chaddha et al.; An End to End Software Only Scalable Video Delivery System; 1995.*
The ATM Forum Technical Committee, "Inverse Multiplexing for ATM (IMA) Specification Version 1.1," Mar. 1999, 1-185 pp.

* cited by examiner

*Primary Examiner*—Kenneth R. Coulter
(74) *Attorney, Agent, or Firm*—Fogg and Associates, LLC; David N. Fogg (57) ABSTRACT

An apparatus for dynamically controlling the delivery of data over a network is provided. The apparatus includes a network interface circuit with at least one communication port adapted to be coupled to a network. The apparatus further includes an encoder that is communicatively coupled to the network interface circuit. The encoder is adapted to receive data from a source and to encode the data with a selectable level of compression. The network interface circuit includes a control mechanism that provides a signal to select the level of compression for the encoder based on at least one parameter.

45 Claims, 5 Drawing Sheets

REDUCING LOSS IN TRANSMISSION QUALITY UNDER CHANGING NETWORK CONDITIONS

TECHNICAL FIELD

The present invention relates generally to the field of telecommunications and, in particular, to reducing loss in transmission quality under changing network conditions.

BACKGROUND

Telecommunication networks transport signals between devices, e.g., telephones, computers, facsimile machines, televisions and other devices, at diverse locations. Originally, telecommunication networks were designed to carry primarily voice traffic. Thus, the telephone network was designed around frequency channels with a narrow frequency band, e.g., a low data rate.

With the introduction of computers, the telephone networks have been called on to carry additional types of traffic, e.g., video, and high-speed data. Further, new telecommunications networks have been developed, e.g., asynchronous transfer mode (ATM) networks, to respond to the need for transmitting higher volumes of data at higher speeds.

Video traffic typically is data intensive. To reduce the burden of the video traffic on the telecommunications network, it is common practice to compress the video data prior to transmission. Several standards exist for compressing video data. For example, the Motion Picture Expert Group has promulgated a family of standards for compression of video data referred to as the "MPEG" standards. Under these standards, the amount of data compression is selectable and can vary from application to application. With video compression, an encoder essentially transmits signals to a corresponding decoder that includes changes in the video image from frame-to-frame. The decoder reproduces the original video signal based on the transmitted changes.

Once compressed, video data is typically provided to a transport network, e.g., an ATM network, through a network interface card. The network interface card used in a specific embodiment depends on the type of connection to the network. For example, an inverse multiplexer (IMUX) is used in some systems to provide a connection to the network via a plurality of time division multiplexed connections, e.g., T1, and E1 connections. The ATM Forum has promulgated a specification for transport of ATM cells using an inverse multiplexer. The standard is titled "Inverse Multiplexing for ATM (IMA) Specification Version 1.1," AF-PHY-0086.001, March 1999 (the "IMA Specification"). The IMA specification is incorporated by reference. In other systems, the network interface card comprises an interface for a DS3 line or other appropriate interface card based on the type of connection to the network.

In current designs, a problem exists in delivering compressed video over a network via an IMUX network interface card such as an IMA compliant IMUX. The problem arises when one of the plurality of T1 or E1 connections carrying the video data to the network is lost. When the connection is lost, the available bandwidth that was used to deliver the video data is reduced. Eventually, some of the video data is lost during transmission over the network.

At the video decoder, the results of the loss of the connection can be catastrophic. The video decoder continues to attempt to reconstruct the video signal from the data received over the network. With portions of the data missing, the decoder begins to produce a lower quality video output since not all changes for a given frame are received. Due to the nature of compressed video, this problem is only compounded with each passing frame of video. Thus, it does not take long before the quality of the video output at the receiver is completely degraded.

For the reasons stated above, and for other reasons stated below which will become apparent to those skilled in the art upon reading and understanding the present specification, there is a need in the art for a mechanism that reduces loss in transmission quality under changing network conditions.

SUMMARY

The above-mentioned problems with telecommunications networks and other problems are addressed by embodiments of the present invention and will be understood by reading and studying the following specification. Embodiments of the present invention provide a mechanism that assures quality of data transmission over a network by monitoring at least one parameter for the network and, when necessary, adjusting the compression of data to account for the changed condition. Advantageously, this mechanism operates on the fly and can account for changes on a frame-by-frame basis in video transmission.

More particularly, in one embodiment an apparatus for dynamically controlling the delivery of data over a network is provided. The apparatus includes a network interface circuit with at least one communication port adapted to be coupled to a network. The apparatus further includes an encoder that is communicatively coupled to the network interface circuit. The encoder is adapted to receive data from a source and to encode the data with a selectable level of compression. The network interface circuit includes a control mechanism that provides a signal to select the level of compression for the encoder based on at least one parameter.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
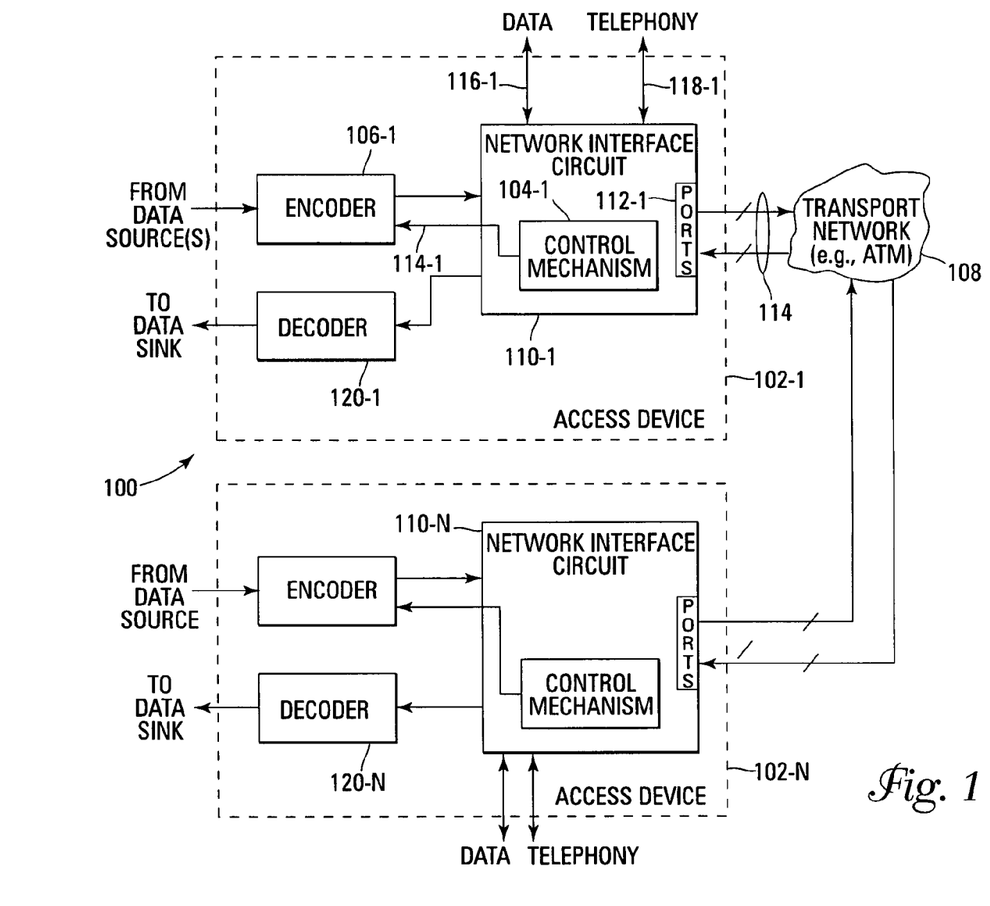
FIG. 1 is a block diagram of an embodiment of a telecommunications network including an access device with a control mechanism that establishes a level of compression for an encoder for at least one data source according to the teachings of the present invention.

FIG. 1 is a block diagram of an embodiment of a telecommunications network, indicated generally at 100, including access devices 102-1, . . . , 102-N each with an associated control mechanism 104-1, . . . , 104-N that establishes a level of compression for an associated encoder 106-1, . . . , 106-N for at least one data source according to the teachings of the present invention. Network 100 further includes transport network 108 that couples access device 102-1, . . . , 102-N together. Due to the similarities between access device 102-1 and 102-N, only access device 102-1 is described in detail. However, it is understood that the other access devices in network 100 are constructed in a similar manner. Further, although only two access devices are shown in FIG. 1, it is understood that any appropriate number of access devices may be included in a particular application.

Access device 102-1 is coupled to transport network 108 through network interface circuit 110-1. In one embodiment, network interface circuit 110-1 comprises an inverse multiplexer (IMUX) that is compliant with the IMA Specification incorporated by reference above. In other embodiments, network interface circuit 110-1 comprises a network interface card that is compatible with a communication medium used to connect access device 102-1 with transport network 108, e.g., an inverse multiplexer, a DS3 card, a network interface card for an optical link or the like.

Network interface circuit 110-1 includes a plurality of ports 112-1 for connection to transport network 108. Ports 112-1 are coupled to transport network 108 over a plurality of communication links 114. In one embodiment, transport network 108 comprises an asynchronous transfer mode (ATM) network. Further, in one embodiment, communication links 114 comprise a plurality of T1 or E1 communication links. In other embodiments, communication links 114 comprise a DS3 communication link, fiber-optic links or any other appropriate communication link that is adapted to carry data to transport network 108.

Network interface circuit 110-1 further includes control mechanism 104-1. Control mechanism 104-1 is coupled to encoder 106-1 over bus 114-1. In one embodiment, bus 114-1 comprises a PCI bus. Further, in one embodiment, encoder 106-1 comprises an encoder that is compatible with at least one of the standards promulgated by the Motion Picture Expert Group (MPEG) for compression of video data. In other embodiments, encoder 106-1 uses any other appropriate compression algorithm for compressing data from the data source.

In one embodiment, network interface circuit 110-1 is co-located in a housing with encoder 106-1. Advantageously this allows control mechanism 104-1 to communicate easily with encoder 106-1 to control its level of compression or data rate.

In one embodiment, network interface circuit 110-1 further includes data port 116-1 and telephony ports 118-1. Data port 116-1 is adapted to be coupled to, for example, a 10BaseT Ethernet local area network (LAN), a 100BaseT Ethernet LAN, or other appropriate data network. Similarly, telephony port 118-1 is adapted to be coupled to any appropriate telephony communication line, e.g., a T1 or E1 line.

Access device 102-1 further includes decoder 120-1. Decoder 120-1 is used to decode data received from an encoder located in another access device connected to transport network 108. Thus, in some embodiments, a particular access device may include an encoder, a decoder, or both an encoder and a decoder. Therefore, although access device 102-1 and 102-N each show an encoder and a decoder, it is understood that access devices in network 100 are not limited to including both an encoder and a decoder. The operation of system 100 is described in terms of the flowchart of FIG. 2.

Figure 2:
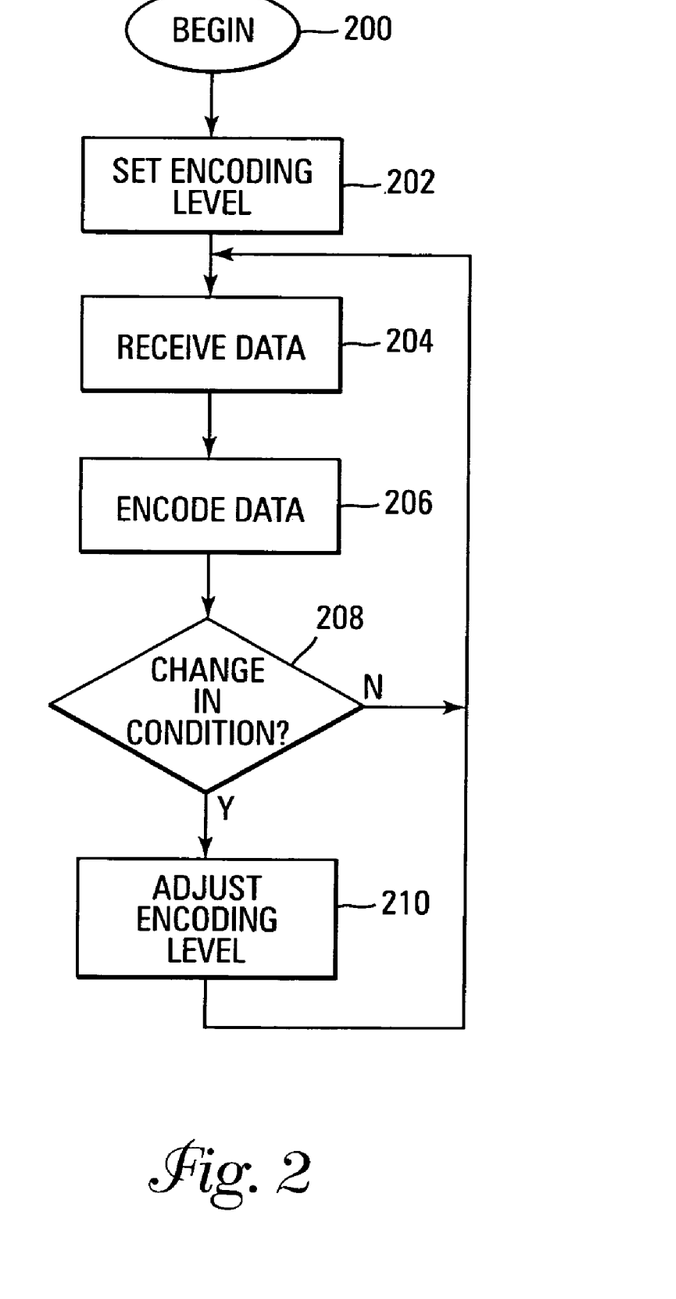
FIG. 2 is a flowchart of an embodiment of a process for the operation of the network of FIG. 1.

In operation, network 100 transports data between access devices over transport network 108. Advantageously, network 100 includes control mechanism 104-1 that adjusts a level of encoding in encoder 106-1 to reduce loss of transmission quality in response to changing network conditions. The method begins at block 200. At block 202 control mechanism 104-1 sets a level of encoding for encoder 106-1. For example, control mechanism 104-1 communicates a rate for encoder 106-1 over PCI bus 114-1. In another embodiment, control mechanism 104-1 also provides further parameters to encoder 106-1 to control the encoding level of encoder 106-1.

Access device 102-1 generates data for transmission over transport network 108. At block 204, encoder 106-1 receives data from at least one data source. In one embodiment, the at least one data source comprises a source of video data, e.g., a camera, video player, or other appropriate source of video data. At block 206, encoder 106-1 encodes the data received from the data source using the level of compression specified at block 202. Encoder 106-1 provides the encoded data to network interface circuit 110-1. Network interface circuit 110-1 passes the encoded data over connections 114 to transport network 108. Transport network 108 routes the data to, for example, access device 102-N. In access device 102-N, network interface circuit 110-N passes the encoded data to decoder 120-N. Decoder 120-N decodes the data and provides the data to the data sink, for example, a television, a monitor, a computer, or other appropriate data sink.

At block 208, control mechanism 104-1 determines whether a change in condition has been detected on network 100. For example, control mechanism 104-1 determines whether one or more of communication links 114 has become unusable, e.g., the link is cut or disconnected. Alternatively, control mechanism 104-1 monitors a congestion bit for transport network 108 or other diagnostic mechanism for monitoring the capacity of transport network 108, e.g., buffer levels, statistics on cell loss, cyclic redundancy check at the ATM layer, cyclic redundancy check at the MPEG layer, or other appropriate statistic. In one embodiment, the end-to-end channel of an IMA Control Protocol (ICP) cell, specified in the IMA Specification, is used to communicate a changed condition between access devices. For example, the state of buffers at a decoder requiring a change in the rate of the encoder or a lost connection detected at the decoder is communicated over the end-to-end channel to the access device and encoder associated with transmission to the decoder.

When a change in network conditions is detected, control mechanism 104-1 provides a signal to encoder 106-1 to adjust its level of encoding. For example, when a communication link is lost, control mechanism 104-1 calculates a new rate of encoding for encoder 106-1 and transmits the new rate to encoder 106-1 over bus 114-1 at block 210.

Further, control mechanism 104-1 may also provide information on the rate change to the associated decoder over, for example, the end-to-end channel of an ICP cell.

In one embodiment, control mechanism 104-1 controls the rate of encoding for a plurality of sources. In some embodiments, control mechanism 104-1 reduces data rates for all sources proportionately. In other embodiments, control mechanism 104-1 reduces data rates for each source selectively based on a set algorithm or criteria. In other embodiments, control mechanism 104-1 adjusts other inputs to encoder 106-1 to adapt the output of encoder 106-1 to the changed condition. These other inputs can be used as a primary control of encoder 106-1 or as a secondary adjustment implemented after an initial rate change. The other inputs include, but are not limited to, settings for quantizers, buffer sizes, on/off padding, coefficients, video resolution, and any other appropriate adjustments or inputs acceptable to the encoder.

Figure 3:
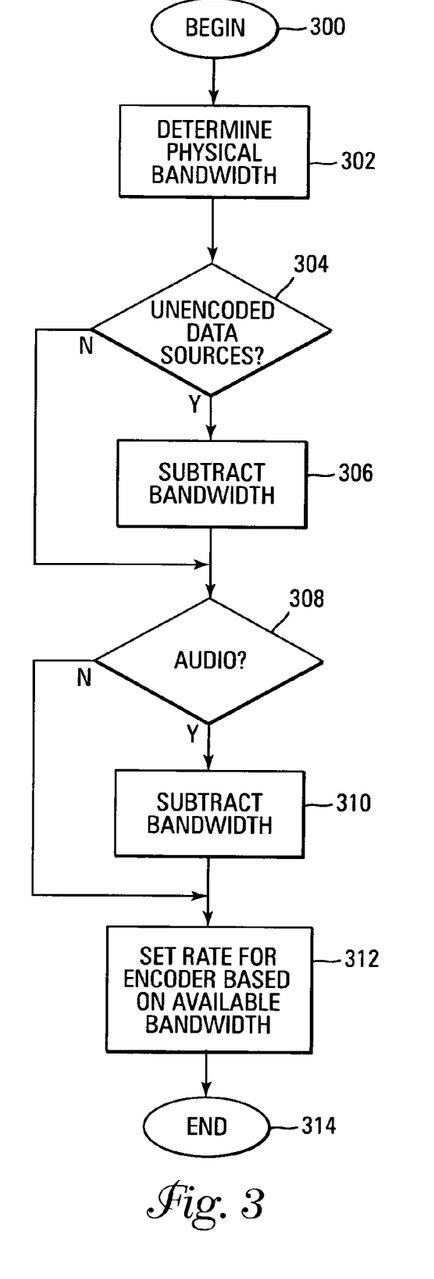
FIG. 3 is a flowchart of an embodiment of a process for generating a control signal to adjust a level of compression for an encoder in an access device according to the teachings of the present invention.

FIG. 3 is a flowchart of an embodiment of a process for generating a control signal to adjust a level of encoding for an encoder in an access device according to the teachings of the present invention. This method is implemented, for example, in control mechanism 104-1 of access device 102-1 in system 100 during a synchronization process. The synchronization process may be accomplished either when a connection for a data stream is initialized, or during a resynchronization process after a change in bandwidth.

The method begins a block 300. At block 302, the method determines the physical bandwidth available for the access device. For example, when a number of physical links are used, the method calculates the available bandwidth by multiplying the number of links times the link rate. At block 304, the method determines whether any unencoded data sources are provided to the access device. If unencoded data sources are provided to the access device, the method subtracts out bandwidth associated with the unencoded data sources at block 306 from the physical bandwidth determined at block 302. If there are no unencoded data sources, the method proceeds directly to block 308.

At block 308, the method determines whether the access device receives any audio data. If the access device receives audio data, the method subtracts out bandwidth associated with the audio data at block 310. If, however, the access device does not receive audio data, the method proceeds directly to block 312.

At block 312, the method sets the rate for the encoder of the access device based on the available bandwidth. The method ends at block 314.

Figure 4:
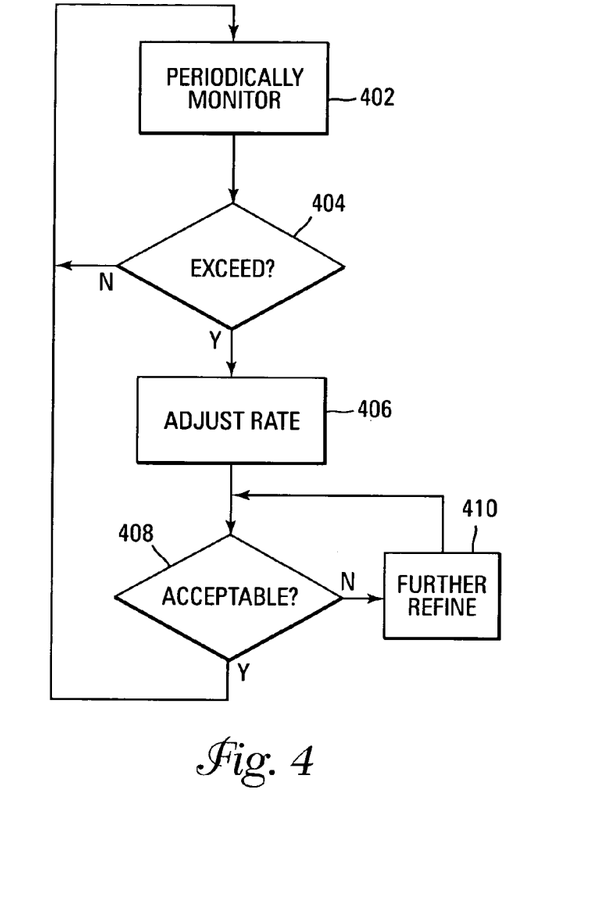
FIG. 4 is a flowchart of an embodiment of a process for adjusting a level of compression for an encoder in an access device of a telecommunications network according to the teachings of present invention.

FIG. 4 is a flowchart of an embodiment of a process for adjusting a level of encoding for an encoder in an access device of a telecommunications network according to the teachings of present invention. This method is implemented, for example, in control mechanism 104-1 of access device 102-1 in system 100. In one embodiment, the method of FIG. 4 is implemented as part of diagnostic routines that periodically monitor aspects of access device 102-1 as indicated at block 402. This monitoring includes, for example, monitoring of buffer levels, loss of cells, error levels as indicated based on cyclic redundancy checks based on cells at the ATM layer or at the MPEG layer or other appropriate parameters or conditions of the network.

At block 404, the method determines whether a threshold in the monitored condition has been exceeded. If the threshold has been exceeded, the method adjusts the rate of the encoder at block 406, e.g., reduces the level of encoding to compensate for the excess in errors in the system.

At block 408, the method determines whether the monitored condition is acceptable after adjusting the rate. If not, the method proceeds to refine the rate at block 410 and returns to block 408. If, however, the method determines that the monitored condition is acceptable, the method returns to block 402. Similarly, if the method determines a block 404 that the threshold has not been exceeded, the method also returns to block 402.

Figure 5:
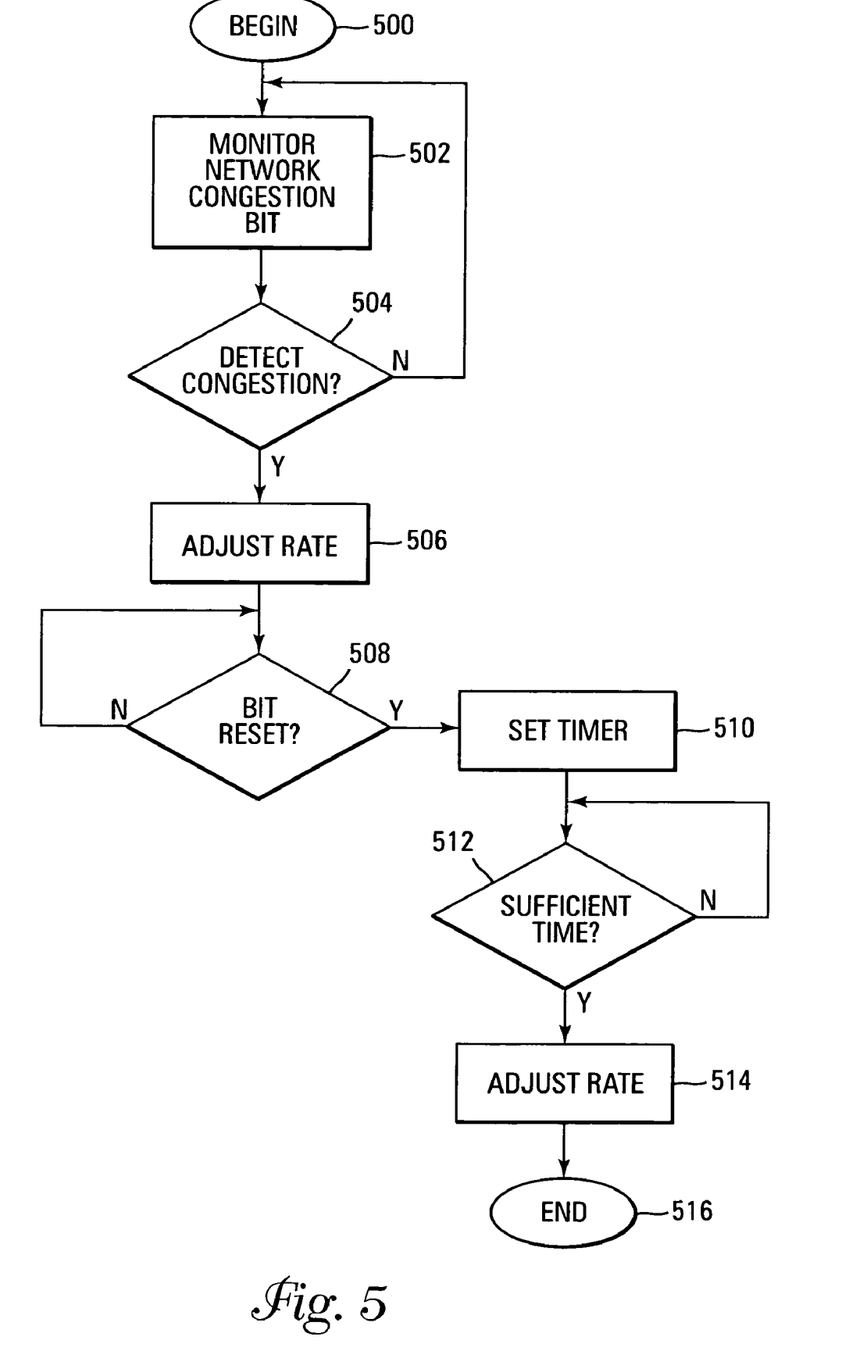
FIG. 5 is a flowchart of another embodiment of a process for adjusting a level of compression for an encoder in an access device of a telecommunications network according to the teachings of the present invention.

FIG. 5 is a flowchart of another embodiment of a process for adjusting a level of compression for an encoder in an access device of a telecommunications network according to the teachings of the present invention. This method is implemented, for example, in control mechanism 104-1 of access device 102-1 in system 100. In one embodiment, the method of FIG. 5 is implemented as part of a diagnostic routine that periodically monitors a network congestion bit.

The method begins at block 500 and monitors a network congestion bit at block 502. At block 504, the method determines whether the network congestion bit indicates congestion in the network. If not, the method returns to block 502. If, however, the method determines that there is network congestion, the method proceeds to block 506. At block 506, the method adjusts the rate of the encoder, e.g., reduces the output rate of the encoder, to compensate for the network congestion.

At block 508, the method determines whether the congestion bit has been reset. If not, the method returns to block 508. If, however, the congestion bit has been reset, the method proceeds to block 510. At block 510, the method sets a timer. At block 512, the method determines whether sufficient time has elapsed since the reset of the congestion bit to allow the encoder to return to a higher data rate. If not, the method returns to block 512. If, however, sufficient time has elapsed, the method proceeds to block 514 and adjusts the rate of the encoder, e.g., returns the encoder to the original rate.

Figure 6:
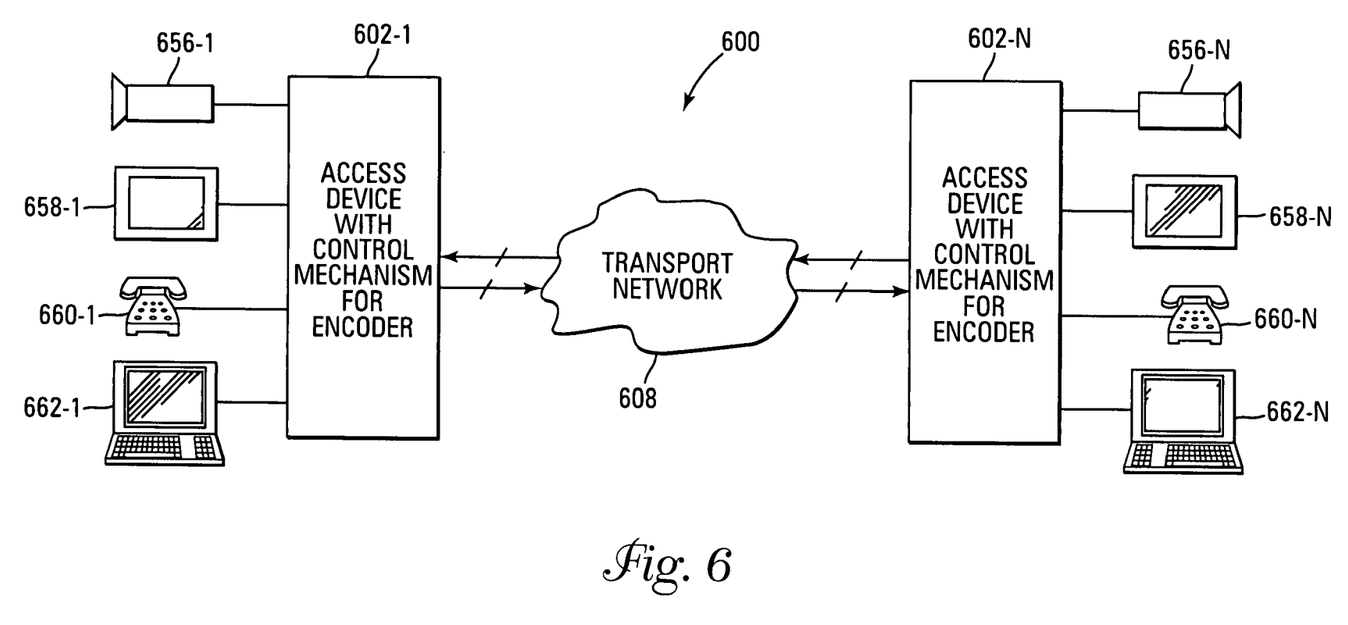
FIG. 6 is a block diagram of an embodiment of a distance learning system that includes a plurality of access devices each with a control mechanism that establishes a level of compression for an encoder for at least one data source according to the teachings of the present invention.

FIG. 6 is a block diagram of an embodiment of a distance learning system, indicated generally at 600, that includes a plurality of access devices 602-1, . . . , 602-N each with a control mechanism that establishes a level of compression for an encoder for at least one data source according to the teachings of the present invention. In one embodiment, each of access devices 602-1, . . . , 602-N is constructed as shown and described above with respect to FIG. 1. Further, each of access devices 602-1, . . . , 602-N implements one or more of the functions described above with respect to FIGS. 1 through 5. Access devices 602-1, . . . , 602-N are coupled together over transport network 608. In one embodiment, transport network 608 comprises an ATM network coupled to the access devices over a plurality of T1 or E1 lines.

Distance learning system 600 includes a plurality of data sources coupled to each access device. For example, access device 602-1 is coupled to receive data from camera/microphone 656-1, telephone 661, and computer or network 662-1. Access device 602-1 is similarly coupled to a plurality of data sources. Further, each access device also includes one or more data sinks, e.g., monitor/speakers 658-1, telephone 661, and computer or network 662-1. It is understood, however, that each access device may be coupled to any appropriate combination or subcombination of data sources and data sinks.

In operation, distance learning system 600 transport data between access devices over transport network 608. Advantageously, access devices 602-1, . . . , 602-N each include a control mechanism that controls an encoder based on conditions in the network as described above with respect to one or more of FIGS. 1 through 5.

CONCLUSION

Embodiments of the present invention have been described. The embodiments provide a mechanism for reducing loss in quality transmission over a network with changing network conditions. Specifically, embodiments of the present invention utilize a control mechanism that adjusts the level of encoding for an encoder based on a monitored condition or parameter of a network. For example, the control mechanism may adjust the encoding level based on the monitored bandwidth availability, network congestion bit, or other statistical information relating to the quality of transmission over a network.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, the transport network in other embodiments comprises other packet-based networks. Further, the control mechanism of an access device provides control data to an associated encoder over any appropriate communications mechanism. An access device in other embodiments includes one or more encoders and one or more decoders. Further, in some embodiments, an access device includes no decoders. Further, in other embodiments, other parameters or statistics that indicate the quality of transmission in the network may be used by a control mechanism to adjust the rate of an encoder.

What is claimed is:

1. A method for reducing a loss in transmission quality with changing network conditions, the method comprising:
   receiving data from a source;
   encoding the data with a first rate;
   detecting a loss of at least one of a plurality of communication links between an access device of a communication network and a network; and
   adjusting the level of encoding to respond to the loss of the at least one of a plurality of communication links.

2. The method of claim 1, wherein receiving data from a source comprises receiving video data from a video source.

3. The method of claim 1, wherein receiving data from a source comprises receiving data from a plurality of sources.

4. The method of claim 1, wherein encoding the data comprises encoding the data with an MPEG encoder.

5. The method of claim 1, further comprising: monitoring, cyclic redundancy check at the ATM layer, and cyclic redundancy check at the MPEG layer.

6. The method of claim 1, further comprising: monitoring buffer conditions in an access device of a communication network.

7. The method of claim 1, further comprising: monitoring data rates from a plurality of data sources.

8. A method for reducing loss of transmission quality with changing network conditions, the method comprising:
   receiving data from a source;
   encoding the data with a first rate;
   monitoring a plurality of connections to a network;
   wherein when at least one of the plurality of connections becomes unusable, adjusting the level of encoding to respond to the changed condition.

9. The method of claim 8, wherein adjusting the level comprises adjusting the level until the quality of the transmission is acceptable.

10. The method of claim 8, further comprising: monitoring at least one of a buffer level, cyclic redundancy check at the ATM layer, and cyclic redundancy check at the MPEG layer.

11. An apparatus for dynamically controlling the delivery of data over a network, the apparatus comprising:
    a network interface circuit with at least one communication port adapted to be coupled to a network by a plurality of communication links;
    an encoder, communicatively coupled to the network interface circuit, the encoder adapted to receive data from a source and to encode the data with a selectable level of compression; and
    wherein the network interface circuit includes a control mechanism that provides a signal to select the level of compression for the encoder when at least one of the plurality of communication links becomes unusable.

12. The apparatus of claim 11, wherein the encoder is adapted to receive data from at least one of a video source, and an audio source.

13. The apparatus of claim 11, wherein the network interface circuit further is adapted to receive at least one of high-speed data and telephony data.

14. The apparatus of claim 11, wherein the encoder comprises an encoder that is adapted to receive input from a plurality of data sources.

15. The apparatus of claim 11, wherein the network interface circuit comprises an inverse multiplexer (IMUX) with a plurality of network ports, each network port adapted to be coupled to a selected communication link of the network.

16. The apparatus of claim 15, wherein each port is adapted to be coupled to at least one of a T1 and an E1 communication link.

17. The apparatus of claim 11, and further comprising a bus, communicatively coupling the network interface circuit and the encoder, the bus being adapted to carry commands from the control mechanism of the network interface circuit to the encoder.

18. The apparatus of claim 11, wherein the control mechanism generates signals to control the rate of the encoder based on at least one of available bandwidth, buffer levels, network congestion, cell loss and signals over an end-to-end channel of the network.

19. The apparatus of claim 11, wherein the control mechanism adjusts data rates for a plurality of sources pro rata based on at least one of when at least one of the plurality of communication links become unusable, available bandwidth, buffer levels, network congestion, cell loss and signals over an end-to-end channel of the network.

20. The apparatus of claim 11, wherein the control mechanism selectively and independently adjusts data rates for a plurality sources.

21. The apparatus of claim 11, wherein the control mechanism adjusts the data rate of the encoder to control the level of compression.

22. The apparatus of claim 11, wherein the control mechanism further adjusts other parameters of the encoder based on at least one of when at least one of the plurality of communication links becomes unusable, available bandwidth, buffer levels, network congestion, cell loss and signals over an end-to-end channel of the network.

23. A method for controlling delivery of video over an asynchronous transfer mode (ATM) network, the method comprising:
    monitoring a plurality of connections to the ATM network used to transmit video data from at least one source;

when synchronizing the plurality of connections to the ATM network:
calculating an available bandwidth for delivering the video data;
establishing a data rate for a video encoder used to deliver the video data based on the available bandwidth; and
wherein when at least one of the plurality of connections becomes unusable:
calculating an available bandwidth for delivering the video data; and
establishing a second, different data rate for a video encoder used to deliver the video data based on the currently available bandwidth.

24. The method of claim 23, wherein calculating the available bandwidth comprises:
determining physical bandwidth; and
adjusting bandwidth for sources not processed by the video encoder.

25. An access device, comprising:
a network interface circuit having a plurality of network ports adapted to couple to a plurality of communication lines for an asynchronous transfer mode (ATM) network, a data port adapted to couple to at least one data source, and at least one telephony port adapted to couple to at least one telephony line;
an encoder, communicatively coupled to the network interface circuit, that is adapted to receive data from at least one audio/video source; and
a control mechanism, communicatively coupled with the network interface circuit and the encoder, the control mechanism producing at least one control signal to control the rate of the encoder based on when one of the plurality of connections to the ATM network is unusable.

26. The access device of claim 25, wherein the network interface circuit, the encoder and the control mechanism are located in a common housing.

27. The access device of claim 25, wherein the encoder and the control mechanism are communicatively coupled over a bus.

28. The access device of claim 25, wherein the encoder comprises an MPEG encoder.

29. The access device of claim 25, wherein the network interface circuit includes an inverse multiplexer circuit.

30. The access device of claim 29, wherein the control mechanism reduces the rate of the encoder when one of the plurality of connections to the ATM network is unusable.

31. A distance learning system, comprising:
a plurality of access devices coupled together over a transport network;
a plurality of data sources and sinks, each data source and each data sink coupled to one of the access devices; and
wherein each access device comprises:
a network interface circuit with at least one communication port adapted to be coupled to the transport network;
an encoder, communicatively coupled to the network interface circuit, the encoder adapted to receive data from a source and to encode the data with a selectable level of compression; and
wherein the network interface circuit includes a control mechanism that provides a signal to select the level of compression for the encoder based on a loss of at least one of a plurality of communication links between the plurality of access devices and the transport network.

32. The distance learning system of claim 31, wherein the plurality of data sources and data sinks includes one or more of a telephone, a monitor, a camera, a computer, and a computer network.

33. An apparatus for dynamically controlling the delivery of data over a network, the apparatus comprising:
a network interface circuit with at least one communication port adapted to be coupled to a network;
an encoder, communicatively coupled to the network interface circuit, the encoder adapted to receive data from a source and to encode the data with a selectable level of compression; and
wherein the network interface circuit includes a control mechanism that provides a signal to select the level of compression for the encoder based on when at least one of a plurality of connections between the network interface circuit and the network becomes unusable.

34. The apparatus of claim 33, wherein the encoder is adapted to receive data from at least one of a video source, and an audio source.

35. The apparatus of claim 33, wherein the network interface circuit further is adapted to receive at least one of high-speed data and telephony data.

36. The apparatus of claim 33, wherein the encoder comprises an encoder that is adapted to receive input from a plurality of data sources.

37. The apparatus of claim 33, wherein the network interface circuit comprises an inverse multiplexer (IMUX) with a plurality of network ports, each network port adapted to be coupled to a selected communication link of the network.

38. The apparatus of claim 37, wherein each port is adapted to be coupled to at least one of a T1 and an E1 communication link.

39. The apparatus of claim 33, and further comprising a bus, communicatively coupling the network interface circuit and the encoder, the bus being adapted to carry commands from the control mechanism of the network interface circuit to the encoder.

40. The apparatus of claim 33, wherein the control mechanism generates signals to control the rate of the encoder based on at least one of available bandwidth, buffer levels and signals over an end-to-end channel of the network.

41. The apparatus of claim 33, wherein the control mechanism adjusts data rates for a plurality of sources pro rata based on the at least one non-congestion or non-cell loss based parameter.

42. The apparatus of claim 33, wherein the control mechanism selectively and independently adjusts data rates for a plurality sources.

43. The apparatus of claim 33, wherein the control mechanism adjusts the data rate of the encoder to control the level of compression.

44. The apparatus of claim 33, wherein the control mechanism further adjusts other parameters of the encoder based on the at least one non-congestion or non-cell loss based parameter.

45. The apparatus of claim 33, wherein detecting a changed condition comprises monitoring at least one of available bandwidth, buffer levels and signals over an end-to-end channel of the network.

* * * * *